United States Patent
Plammer

(10) Patent No.: US 7,029,265 B2
(45) Date of Patent: Apr. 18, 2006

(54) APPARATUS FOR PRODUCING PLASTIC PANELS WITH UNDERCUT

(75) Inventor: Alfred Plammer, Seewalchen (AT)

(73) Assignee: Alois Gruber GmbH, Bad Hall (AT)

( * ) Notice: Subject to any disclaimer, the term of this patent is extended or adjusted under 35 U.S.C. 154(b) by 0 days.

(21) Appl. No.: 10/725,559

(22) Filed: Dec. 3, 2003

(65) Prior Publication Data

US 2004/0109910 A1 Jun. 10, 2004

Related U.S. Application Data

(62) Division of application No. 09/857,176, filed as application No. PCT/EP99/07904 on Oct. 19, 1999, now Pat. No. 6,908,580.

(51) Int. Cl.
*B29C 45/44* (2006.01)

(52) U.S. Cl. ............... 425/328; 425/327; 425/385; 425/394; 425/224; 425/363; 425/438; 425/441; 264/172; 264/174; 264/252; 264/254; 264/255; 264/328; 264/243; 264/251; 264/318; 264/166; 264/167; 264/334; 264/336

(58) Field of Classification Search ............... 425/327, 425/174.4, 328, 174.2, 385, 814, 394, 224, 425/363, 438, 441, 443; 264/178, 171, 172, 264/174, 252, 254, 255, 328, 243, 251, 318, 264/166, 167, 334, 336

See application file for complete search history.

(56) References Cited

U.S. PATENT DOCUMENTS

| | | | | |
|---|---|---|---|---|
| 1,698,925 A | * | 1/1929 | Stickney | 29/505 |
| 3,507,010 A | * | 4/1970 | Doleman et al. | 425/134 |
| 3,590,109 A | * | 6/1971 | Doleman et al. | 264/167 |
| 3,752,619 A | * | 8/1973 | Menzin et al. | 425/134 |
| 3,758,657 A | * | 9/1973 | Menzin et al. | 264/166 |
| 4,050,873 A | | 9/1977 | Brumlik et al. | |
| 4,196,035 A | * | 4/1980 | Reil | 156/361 |
| 4,323,533 A | | 4/1982 | Bramhall | |

(Continued)

FOREIGN PATENT DOCUMENTS

DE 196 47 232 A1 2/1998

(Continued)

Primary Examiner—Joseph Del Sole
Assistant Examiner—G. Nagesh Rao
(74) Attorney, Agent, or Firm—Rothwell Figg Ernst & Manbeck

(57) ABSTRACT

An apparatus for the continuous and nondestructive production of plastic panels which are provided with undercut anchoring studs, web profiles or other forms of attachment (28) on one or both surfaces comprises a temperature-controlled chill roll (11), which has peripheral cooling bores (15) in the roll body (17). The roll body (17) is formed at the circumference as a polygon with flat supporting surfaces (25), against which the molding/demolding strips (13) are placed or from which they are lifted. The molding/demolding strips (13) are moved by means of piston/cylinder arrangements (16) and piston rods (18). The piston rods (18) move through transverse bores through the roll body (17).

The melt is filled into molds (27) of the molding/demolding strips (13) by the counterpressure between the shaping roll (11) and a counterroll (10) and is cooled down. During the filling of the molds (27), the molding/demolding strips (13) are pressed against the flat faces of the roll body (17). After cooling down, the plastic panel (20) produced, with anchoring studs (28) or other forms, is released in a nondestructive manner by opening the molding/demolding strips (13).

A plastic panel produced on such a calender (3) has undercut attachments (28), which are formed integrally with the plastic panel (20).

19 Claims, 4 Drawing Sheets

U.S. PATENT DOCUMENTS

| | | | |
|---|---|---|---|
| 4,350,656 A * | 9/1982 | Moertel | 264/166 |
| 4,362,687 A * | 12/1982 | Olschewski et al. | 264/318 |
| 4,383,670 A * | 5/1983 | Olschewski et al. | 249/60 |
| 4,431,399 A * | 2/1984 | Moertel | 425/545 |
| 4,440,702 A * | 4/1984 | Susnjara | 264/37.32 |
| 4,725,221 A * | 2/1988 | Blanz | 425/575 |
| 4,957,425 A | 9/1990 | Fay | |
| 5,057,259 A * | 10/1991 | Parmelee | 264/166 |
| 5,167,895 A | 12/1992 | Lueghamer | |
| 5,690,875 A * | 11/1997 | Sakakibara et al. | 264/146 |
| 5,702,797 A * | 12/1997 | Sakakibara et al. | 428/100 |
| 6,162,040 A * | 12/2000 | Clune | 425/363 |
| 6,187,247 B1 * | 2/2001 | Buzzell et al. | 264/334 |
| 6,540,497 B1 * | 4/2003 | Fuda et al. | 425/174.2 |

FOREIGN PATENT DOCUMENTS

| | | |
|---|---|---|
| EP | 0580073 A2 | 1/1994 |
| EP | 580073 A2 * | 1/1994 |
| EP | 0960710 | 12/1999 |
| GB | 874041 | 8/1961 |
| JP | 2000225650 A * | 8/2000 |

* cited by examiner

APPARATUS FOR PRODUCING PLASTIC PANELS WITH UNDERCUT

This application is a DIV of Ser. No. 09/857,176 Jun. 18, 2001 U.S. Pat. No. 6,908,580 which is a 371 of PCT/EP99/ 07904 Oct. 19, 1999.

The invention relates to a process for producing plastic panels, preferably from thermoplastic material, which are provided on at least one side with undercut attachments formed integrally with them, the plastic being shaped by extruding from a flat die and subsequently passed through at least one roll nip formed by two rolls, and at least one roll being provided with molds which correspond to the undercut attachments and are filled with the polymer. Furthermore, it also relates to an apparatus for producing such plastic panels as well as to these plastic panels themselves.

In principle, the invention describes the continuous production of a plastic panel provided with anchoring studs or other forms or attachments. The apparatus according to the invention is used for example as part of an extrusion system for thermoplastic materials in order to extrude anchor panels, which are used as a chemical-resistant lining or covering for structural elements, such as pipes, pipelines, ducts, basins, tanks, columns etc. of generally cement-bound materials, such as concrete. The connection between the anchoring studs of the plastic panel and that of the concrete-bearing structural element has the effect of achieving a frictional bond.

The anchoring panel is generally produced from thermoplastic materials of high temperature and chemical resistance, such as polyethylene, polypropylene, PVC, PVDF, ETPE or E-CTFE in a continuous extruding and calendering process. The plastic panel may be extruded in one layer or in more than one layer by the co-extrusion process or be laminated and coated as a single- or multi-layer plastic panel with aluminum or other substrates, woven or nonwoven fabrics of polyester or glass fibers.

DE-296 15 818 U presents an apparatus which mechanically pinches trapezoidal elevations on a plastic panel in a second operation, in such a way that an undercut form is produced.

EP 0 436 058 B1 affords protection to a form which is created by pouring polymer melt into the fin-shaped mold cavities of a roll. The molds are provided over the circumference of the roll and are firmly bonded to the roll. The melt fills an altogether undercut fin-shaped mold, is cooled and taken from the roll in the cooled state. The individual, slanting fins are not in themselves undercut. An undercut effect is achieved by two fins always being assigned to each other in such a way that they are oblique in relation to each other.

DE 31 08 972 A1 describes a process in which injection molds are bonded to a smooth sheet by welding to form an anchor panel. This process requires a number of operations: producing the injection molds, producing the sheet and welding the injection molds to the sheet. This procedure causes high production costs in comparison with continuous extrusion.

The documents FR 1 102 294 A and U.S. Pat. No. 2,816,323 as well as DE 29 34 799 A1 also disclose extrusion processes in which undercut multi-wall sheets are extruded parallel to one another in the direction of production. The products of these processes are suitable for lining cast concrete pipes, but their results in endurance tests leave room for improvement. These multi-wall sheets are generally produced from PVC in an extrusion process. The forming of the interconnecting webs takes place in a flat die. The upper lip of the flat die is fabricated in the shape of the webs. The shearing and thermal sensitivity of the plastic PVC has until now allowed production widths of only up to about 1200 mm.

When lining major structures or concrete pipes of relatively large diameter, therefore, a number of pieces have to be welded together. These welds are weak points of the lining and cause further production costs.

All the processes and apparatuses described above for producing panels with undercut attachments lack the possibility of producing continuously in one operation attachments or anchors in the form of an inverted cone or in the form of web-shaped anchors transversely to the direction of production. Some of the known processes impair the function of the anchor panel, or studded panel, by subsequent deformation, damage or weakening of the anchor or the panel or are not capable at all. Some of the processes are limited in the technically possible width or minimum possible panel thickness.

The object of the invention is to specify a process and an apparatus with which it is possible to provide continuous production of plastic panels of the type stated at the beginning, that is to say anchor panels or studded panels, which have individually undercut attachments or studs formed integrally with them, so that in the intended installation in concrete structures it is possible to provide forms of anchor with a particularly good frictional bond, for example in the form of inverted cones or pyramids or else in the form of web profiles extruded transversely to the direction of production. These anchors or studs are also not in any way to weaken or damage the required connection between the anchor and the plastic panel.

This object is achieved according to the invention in the case of the proposed process by the molds being provided in molding/demolding strips which are arranged over the circumference of at least one roll and, once the attachments have left the roll rip, are moved radially outward for the nondestructive release of the formed undercut attachments of the plastic panel. The proposed movement of the molding/demolding strips can be incorporated in the production process, during the calendering of the plastic panel according to the invention, without delaying production. Following the passing through of the studded panel, which is dimensioned in its thickness in the roll nip, and the undercut attachments largely shaped there, the molding/demolding strips are moved in such a way that even anchoring studs undercut with sharp edges can be removed from the shaping roll without any damage. After detaching the studded panel produced in this way according to the invention, the molding/demolding is strips are returned into their starting position again, in order to be available again for the shaping of the undercut attachments after a revolution of the roll of virtually 360°.

According to the invention, it is provided here that the molding/demolding strips are moved radially outward. This brings about an uncomplicated release of the undercut anchoring studs following the passing through of the formed plastic panel in the roll nip.

According to another feature of the invention, it is provided that the molds are arranged approximately half and half in molding/demolding strips adjacent to each other. In this way, a dividable mold is obtained, also permitting nondestructive removal of the plastic panel provided with the undercut attachments from the roll provided with the molds.

It is within the scope of the invention that the plastic panel is extruded in one or more layers. In this way, substrates, such as metal foils, woven or nonwoven fabrics, can be incorporated into the plastic panel. It is also possible to provide the plastic panel according to the invention with a, for example, light-reflecting layer.

Taking the basic idea of the invention a stage further, a modification of the process according to the invention is also proposed to the extent that the molding/demolding strips are provided movably on the surface of a temperature-controlled planar plate and interact with a planar countersurface, the polymer being arranged and melted between the plate and countersurface. In the case of this embodiment, the process according to the invention is transferred into the plane. This modification serves primarily for producing individual panels, predominantly of smaller dimensions.

The apparatus according to the invention for producing plastic panels with undercut attachments or studs formed integrally with them is distinguished in comparison with the prior art in that the molds for forming the undercut attachments are provided in molding/demolding strips which are arranged over the circumference of at least one roll and are designed such that, once the attachments have left the roll nip, they can be moved for the nondestructive release of the formed undercut attachments of the plastic panel. Similarly, as in the case of the process according to the invention, the movable molding/demolding strips permit unproblematical removal of the undercut attachments and of the plastic panel bonded to them from the molds of the attachments after passing through the roll nip.

It is particularly advantageous here if, according to the invention, the molding/demolding strips are mounted such that they can be moved radially outward and if, furthermore, the molds are provided approximately half and half in the molding/demolding strips adjacent to each other. In this way, a maximum opening region of the molds is achieved when they are moved outward from the surface of the roll or rolls having the molds.

A particularly advantageous development of the invention is that the molding/demolding strips can be radially moved hydraulically or pneumatically by means of piston/cylinder arrangements arranged in the rolls. These arrangements are tried-and-tested machine components which ensure reliable operation of the apparatus according to the invention.

The further feature according to the invention, to be specific that a roll shell of the rolls is designed—in cross section—as a polygon with planar faces, and that the molding/demolding strips in the state of rest bear against the faces via corresponding planar supporting surfaces, serves the purpose of a reliably operating apparatus. The arrangement of planar faces over the circumference of the roll shell, against which corresponding planar supporting surfaces of the molding/demolding strips come to bear in the state of rest or bearing state, leads to a stable construction of the molding roll.

As in the case of the process according to the invention, the invention proposes as undercut attachments in particular cones or pyramids inverted with respect to the sheet-like plastic panel. These may be provided as discrete or strip-shaped attachments with the invention it is possible in particular to form web profiles arranged transversely to the direction of production of the plastic panel as undercut attachments.

Finally, the invention also comprises the plastic panel itself, which is produced according to one or more features of the process according to the invention or the apparatus according to the invention.

The roll in which the molds for forming the undercut attachments are provided is temperature-controlled. If the molding/demolding strips are provided on a planar plate, the latter is heated.

The liquid polymer melt is filled into the molds recessed into the molding/demolding strips by the pressure occurring in the roll nip between the molding roll and a counterroll and is cooled down and solidified there. During the filling of the mold, the molding/demolding strips rest on the temperature-controlled roll or the temperature-controlled plate. After the cooling down of the molds, the anchor panel produced is released again nondestructively by lifting the molding/demolding strips. The molds can be refilled after a revolution of the rolls of approximately 360°.

The invention makes it possible to produce cost-effectively forms of anchor with a particularly good frictional fit, which until now could only be welded onto a smooth sheet in a number of operations. By simply exchanging the movable molding/demolding strips, different forms of anchor can be extruded on the same apparatus and the same cooling roll without time-consuming changes of complete rolls. It is consequently possible to cater for different market segments and their different requirements without major investments in a number of rolls. The previous limitation of the width in the case of multi-wall sheets in the direction of extrusion is overcome. This dispenses with the need for expensive prefabrication by welding.

Further details, features and advantages of the invention emerge from the following description of a preferred exemplary embodiment and with reference to the schematic drawing and the patent claims. In the drawing:

Figure 4:
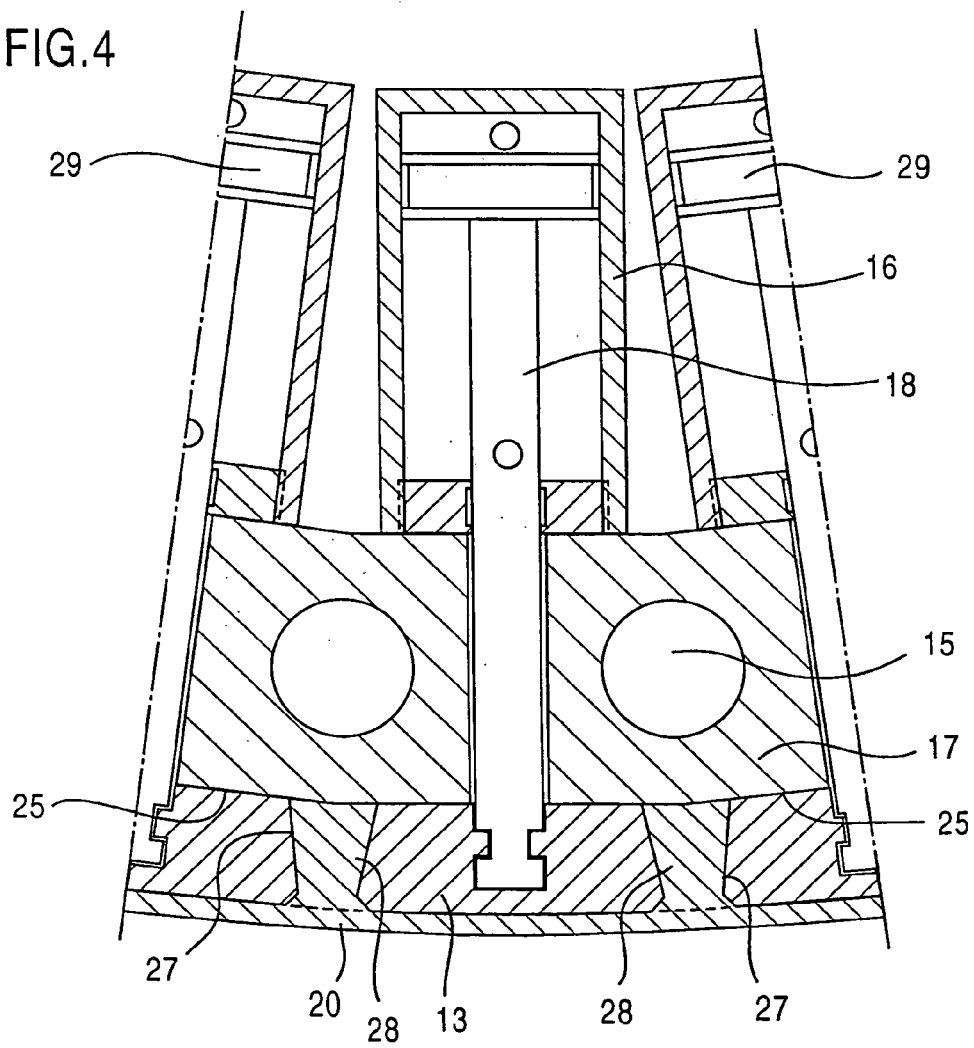

FIG. 4 shows a partial section through the roll provided with molding/demolding strips, in an enlarged representation to represent the drive of the movable strips, or FIGS. 5 to 10 show, partly in plan view and partly in section, different forms of anchors and webs, which can be produced according to the invention in a particularly cost-effective and nondestructive manner integrally with the plastic panel bearing them.

Figure 1:
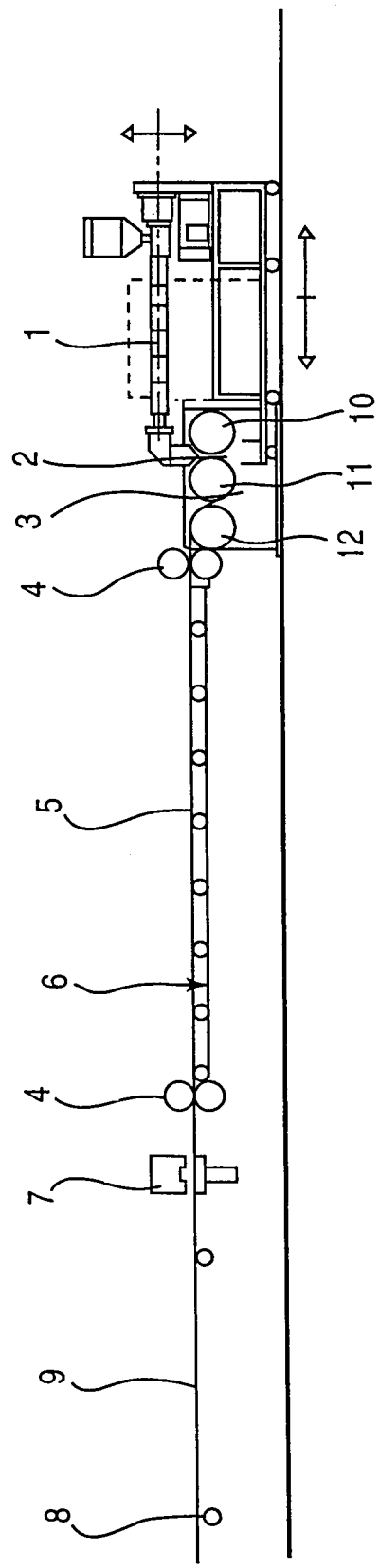
FIG. 1 shows an elevation of the apparatus according to the invention, which is arranged downstream of an extrusion system.

FIG. 1 shows a known extrusion system, with an extruder 1, a flat die 2, a three-roll calender 3, a take-off 4, a cooling zone 5, and edge-trimming device 6, a cross-cutting device 7, a winder 8 and a supporting table 9. In the extruder 1, the processed polymer is melted, homogenized and conveyed to the flat die 2. The latter shapes the melt into a liquid band. The shaped melt is poured from the flat die 2 into the first roll nip of the calender 3. The latter has rolls 10, 11 and 12, which are preferably horizontally arranged. The roll 11 is designed appropriately for the apparatus according to the invention. The individual rolls 10 to 12 are individually driven and individually temperature-controlled. The task of the calender 3 is to shape the melt into a sheet or film with undercut attachments, anchoring studs or other forms of attachment and to cool it. The take-off 4, directly downstream of the calender 3, is designed as a rubber-coated pair of rolls and serves for the stress free taking-off of the plastic panel or studded panel 20 produced, which in the following is also referred to as the anchor panel. In the following cooling zone 5, the plastic panel 20 cools down further, and the edge trimming 6 is carried out. After a second take-off 4, the plastic panel 20 is cross-cut 7 into the desired lengths. The winder 8 winds up thin sheets, the supporting table 9 takes up the rigid panels.

Figure 2:
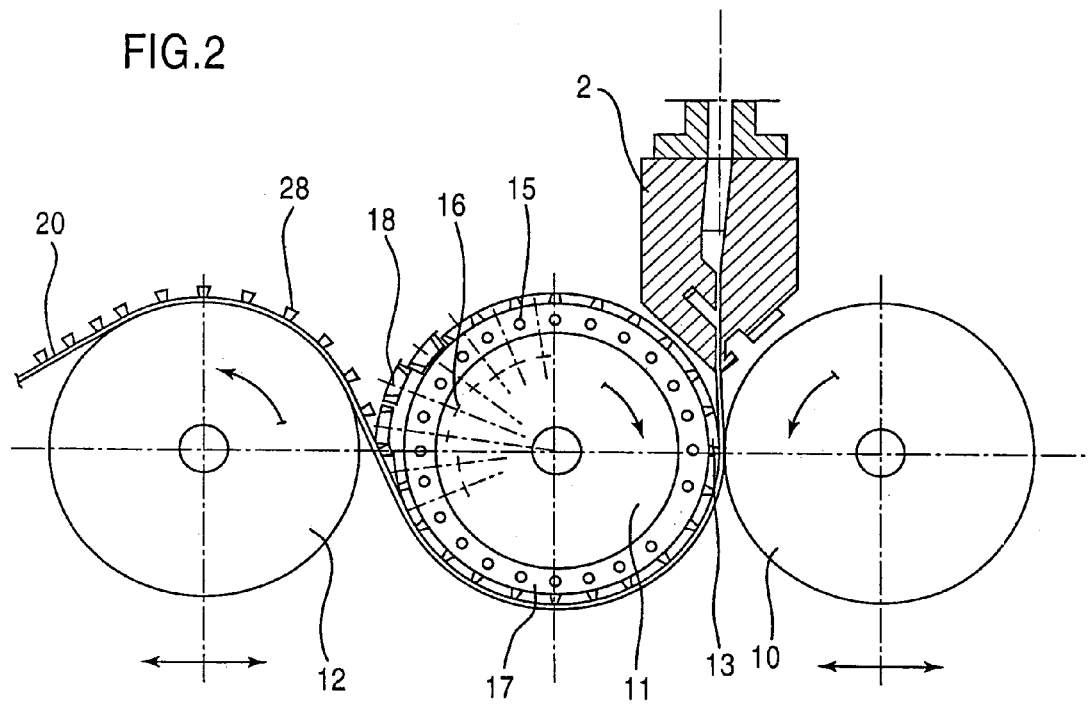
FIG. 2 shows a cross section of three rolls for the continuous production of the studded panel according to the invention.

FIG. 2 shows the apparatus according to the invention in the application as a shaping chill roll 11 and a counterroll 10 with a smooth surface in the horizontal three-roll calender 3. The apparatus according to the invention comprises the roll 11 and a stable roll shell 17, which has on she circumference peripheral cooling bores 15 over the entire surface length of the roll. The cooling bores 15 carry away again the heat supplied to the roll 11 through the polymer melt. The temperature at the roll surface and in the shaping regions of the roll is kept constant. The outer surface of the roll shell 17 is designed in cross section as a polygon, for example with a division of 32 flat faces, i.e. flat supporting surfaces 25. The supporting surfaces 25 are arranged on the circumference in such a way that they alternate with the peripheral cooling bores 15. Therefore, the flat supporting surfaces 25 can be drilled through transversely to the roll shell 17. Through these bores, strips 13 are moved up and down on the roll 11, serving for the molding and demolding of anchor panels in the way according to the invention and referred to below as molding/demolding strips 13. They have recessed into their longitudinal sides molds 27 for the attachments or anchoring studs 28 of the studded panel 20 and are provided in the region of the surface of the roll 11 parallel to the longitudinal axis of the roll.

The molding/demolding strips 13 are preferably opened and closed by means of hydraulic or pneumatic piston cylinders 16. During the filling of the molds 27, the molding/demolding strips 13 are pressed against the flat supporting surfaces 25 of the roll shell 17. In the nip between the roll 10 and roll 11, their prevails a linear pressure, which presses the liquid polymer melt out of the flat die 2 into the molds 27 of the molding/demolding strips 13 bearing on the roll shell 17. Once the melt has cooled down to form an anchor panel 20, the molding/demolding strips 13 are raised by means of the piston/cylinder arrangements 16, arranged over the entire length of the roll surface, and the piston rods 18 and the anchor panel 20 is released nondestructively and is taken off via the roll 12. The pistons of the piston/cylinder arrangements are provided with the reference numeral 29.

Figure 3:
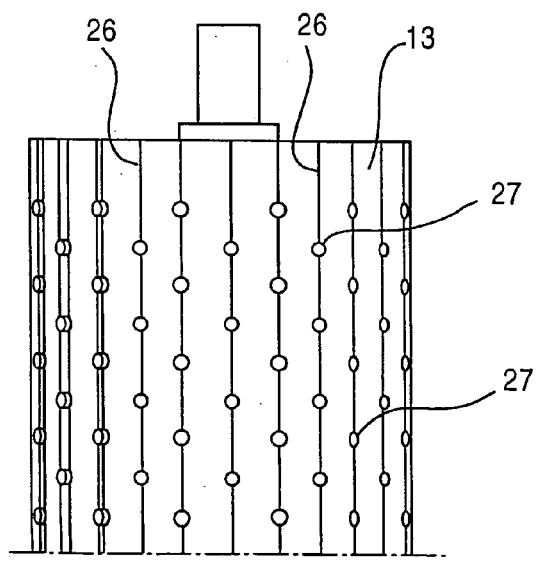
FIG. 3 shows the roll provided with molding/demolding strips, in a partial plan view.

FIG. 3 shows in plan view the apparatus according to the invention, comprising the molding/demolding strips 13 and molds 27 on the longitudinal side of the molding/demolding strips for the shaping of the anchors 28.

FIG. 4 illustrates in section the structure of the apparatus according to the invention, with the roll shell 17 with the flat supporting surfaces 25 on the outer surface, the cooling bores 15 and the molding/demolding strips 13, which are moved by the piston rods 18 in cylinders 16. The opening and closing of the molding/demolding strips 13 preferably takes place hydraulically or pneumatically. The point in time of the opening and closing of the molding/demolding strips 13 by means of the piston rod 16 can be controlled mechanically by means of cam plates or electrically by means of solenoid valves.

Figure 5:
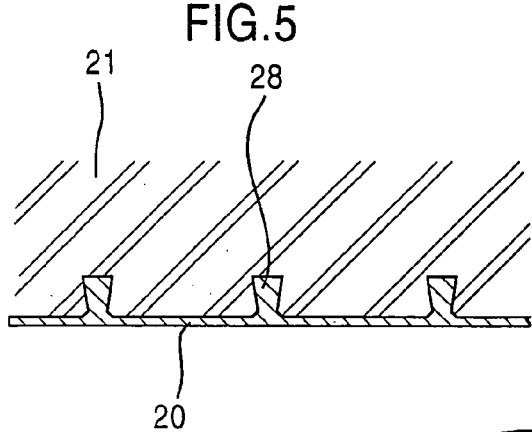

In FIG. 5, an anchor panel 20 built into concrete 21 is represented in section. It is used as shuttering, and the concrete is poured in liquid form behind the anchor panel FIG. 5 clearly illustrates the excellent frictional bond between the anchor panel and the concrete.

The anchor panel 20 can be produced continuously in an extrusion process with the aid of the apparatus according to the invention.

The shaping of the attachments or anchors 28 or other forms is determined by the chosen molds 27 in the molding/demolding strips 13. According to the invention, the molds 27 are recessed on the longitudinal side of the molding/demolding strips 13. Together with the movable arrangement of the molding/demolding strips 13, this permits the nondestructive demolding even of undercut attachments 28. The shaping roll 15 can be used with differently designed molding/demolding strips 13. As a result, it can be used flexibly and can be changed over quickly to new forms by exchanging the molding/demolding strips.

Figure 6:
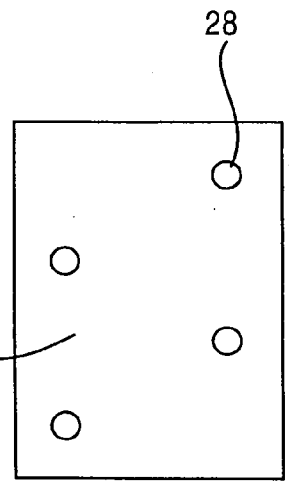

FIG. 6 shows the anchor panel 20 with round forms in plan view in such a way that the anchor 28 resembles an inverted cone.

Figure 7:
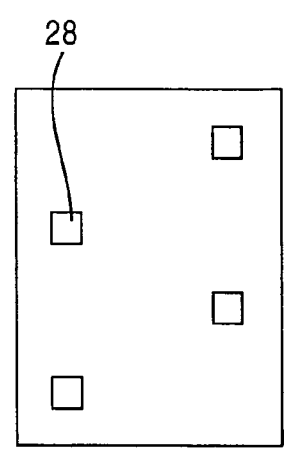

FIG. 7 shows the anchor 28 as an inverted pyramid.

Figure 8:
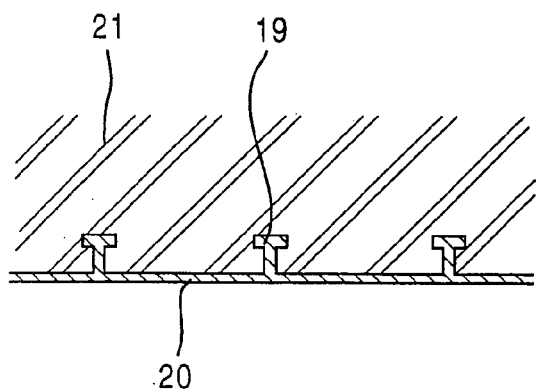
Figure 9:
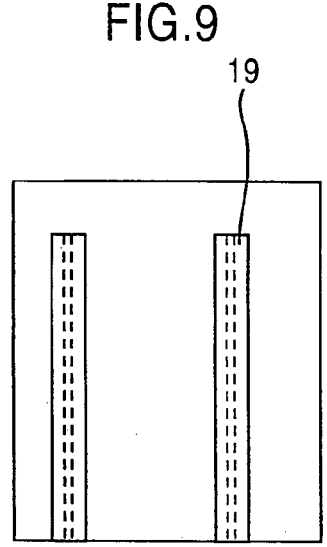
Figure 10:
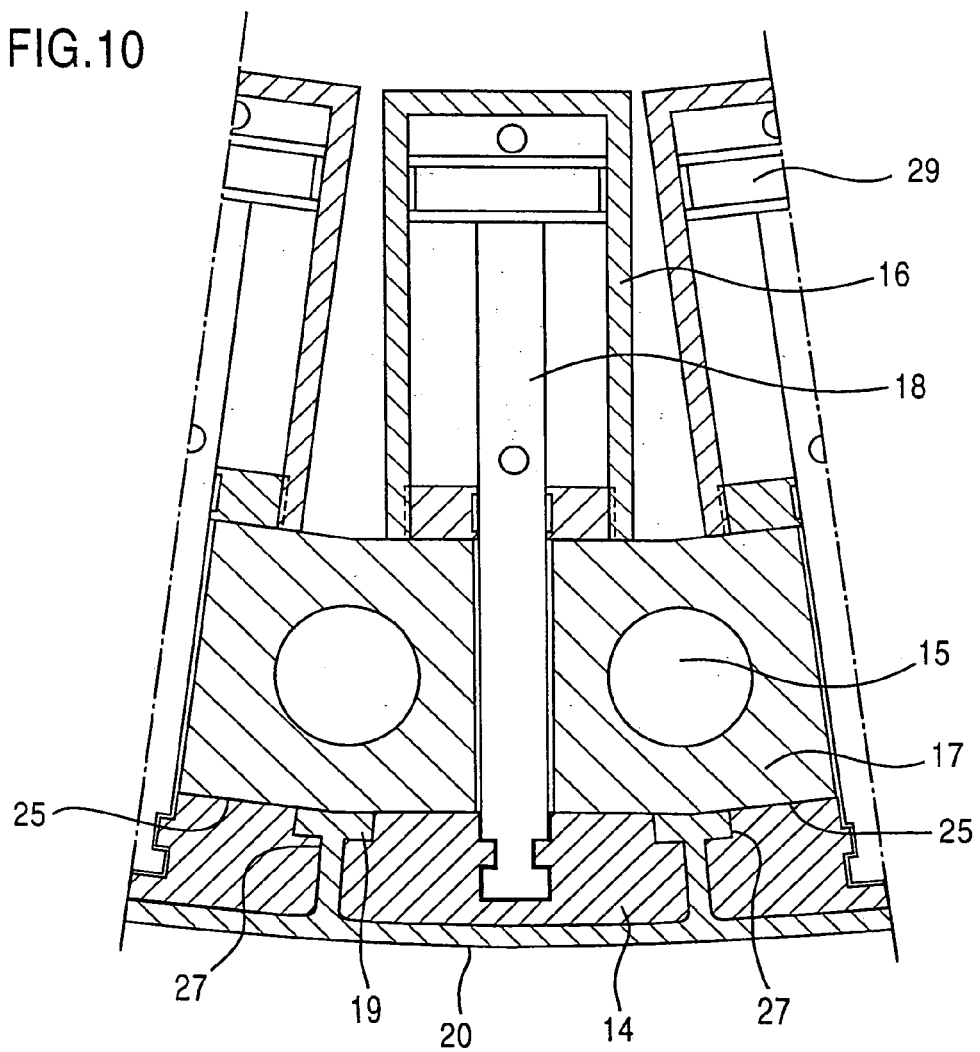

FIG. 8 shows the section of an anchor panel with webs 19, which are integrated with a frictional bond in the concrete 21. In FIG. 9, the anchor panel 20 is provided with webs 19, which run virtually over the width of the plastic panel 20. The webs 19 can be extruded in a continuous and nondestructive manner transversely to the direction of production. The molding/demolding strips 13 of an anchor panel 20 with webs 19 is shown by FIG. 10. Anchor panels 20 with webs 19 are preferably used in the lining of concrete pipes, in particular whenever the width of the anchor panel 20 corresponds to the length of the concrete pipe and this dispenses with the need for expensive fabrication work for the anchor panels. The cross-sectional forms of the attachments, anchors or studs 28 shown in FIGS. 4 and 10 may be both discrete attachments and continuous webs 19.

The molds 27, recessed into the molding/demolding strips 13, may be positive or negative, i.e. protruding or countersunk, on the strips 13 or else formed on the roll shell 17. The molds may be undercut cylindrically, with a positive or negative taper, slotted in the longitudinal or transverse direction, formed in a pyramid shape or in combinations of these. They may be cross-sectionally round, square, rectangular, oval or polygonal, slotted in a T-shaped manner or formed in combinations of these. The surface of the molds may be smooth, honed, polished, roughened, eroded, spirally milled, bored, slotted or formed in combinations of these. The dimensions of the molds are dependent on the height and width of the molding/demolding strips 13 and on the stroke of the hydraulic or pneumatic cylinders. The distance between the molds is dependent on the width and length of the molding/demolding strips. Radial or axial vents in the roll shell or in the molding/demolding strips improve the continuous shaping of the form.

A cost-effective application of the apparatus according to the invention is the continuous extrusion of anchor panels from thermoplastic materials for the corrosion protection and insulation of concrete buildings and structures.

The invention claimed is:

1. An apparatus for producing plastic panels which are provided on at least one side with at least one integral undercut attachment, wherein said apparatus comprises:
   an extruder,
   a die, and
   at least one roll nip formed by at least two rolls,
   wherein the die and the at least one roll nip cooperate so that molten polymer can be fed through said die to said at least one roll nip,
   wherein at least one of said rolls of said roll nip is provided on the roll circumference with at least one mold which corresponds to said undercut attachment, wherein the at least one mold is provided in at least one molding/demolding strip, wherein said molding/ demolding strip has a first non-raised position and a second raised position and wherein the molding/demolding strip is capable of assuming said second position to nondestructively release the at least one undercut attachment of the plastic panel after the at least one undercut attachment has left the at least one roll nip.

2. The apparatus of claim 1, wherein the at least one molding/demolding strip can be moved radially outward to assume said second position.

3. The apparatus of claim 1, wherein:
said at least one molding/demolding strip includes a pair of molding/demolding strips adjacent to each other; and
approximately half of said mold is provided in each adjacent molding/demolding strip.

4. The apparatus of claim 1 further comprising a piston/cylinder arrangement in the rolls wherein the at least one molding/demolding strip is radially movable hydraulically or pneumatically by means of said piston/cylinder arrangement.

5. The apparatus of claim 1 wherein a roll shell of the rolls has a cross section of a polygon with planar faces, and wherein the at least one molding/demolding strip in said first position bears against at least one of said planar faces via a corresponding planar supporting surface.

6. The apparatus of claim 1 wherein the at least one mold provided in the at least one molding/demolding strip has the form of discrete inverted cones or pyramids.

7. The apparatus of claim 6, wherein the at least one cone- or pyramid-shaped mold is provided as at least one strip-shaped recess arranged transversely to the direction of production of the plastic panel.

8. The apparatus of claim 1, wherein the apparatus is capable of forming web profiles arranged transversely to the direction of production of the plastic panel.

9. The apparatus of claim 1, wherein said plastic panels are made from thermoplastic material.

10. The apparatus of claim 1, wherein the thermoplastic material is polyethylene, polypropylene, PVC, PVDF, ETFE or E-CTFE.

11. The apparatus of claim 1, wherein the longitudinal axis of the at least one molding/demolding strip is substantially parallel to the axis of said at least one roll.

12. The apparatus of claim 1, wherein the at least one mold is undercut cylindrically, with positive or negative taper, pyramid shaped or a combination thereof.

13. The apparatus of claim 1, wherein said at least one roll is temperature controlled.

14. The apparatus of claim 13, wherein said at least one roll comprises at least one cooling device that substantially cools the entire surface of said roll.

15. The apparatus of claim 14, wherein said at least one cooling device is a cooling bore.

16. The apparatus of claim 5, wherein said at least one roll comprises cooling bores that are arranged alternating with said planar faces.

17. The apparatus of claim 1, wherein said at least one molding/demolding strip is removably installed.

18. The apparatus of claim 1, wherein the apparatus includes multiple molding/demolding strips, which are arranged over the circumference of the said at least one roll.

19. The apparatus of claim 11, wherein the apparatus includes multiple molding/demolding strips, which are arranged over the circumference of the said at least one roll.

* * * * *